United States Patent Office 2,999,085
Patented Sept. 5, 1961

2,999,085
COPOLYMERS OF MONOALLYLDIALKYL PHOSPHATES AND ACRYLONITRILE

Frederick Ernest King, London, and Victor Francis George Cooke and James Lincoln, Putteridge Bury, near Luton, England, assignors to British Celanese Limited, a corporation of Great Britain
No Drawing. Filed Jan. 27, 1958, Ser. No. 711,175
Claims priority, application Great Britain Feb. 11, 1957
3 Claims. (Cl. 260—85.5)

This application relates to unsaturated phosphorus-containing compounds and to copolymers thereof.

An important object of the invention is to provide a new series of linear copolymers of improved fire-resistance. To this end we copolymerise certain unsaturated phosphorus-containing esters with aliphatic homopolymerisable mono-olefinic compounds of dipole moment greater than 1.

We have found that for the purpose in question suitable unsaturated phosphorus compounds can be obtained in the form of aliphatic esters of neutral phosphorus oxyacids in which one of the aliphatic groups is derived from allyl alcohol or methallyl alcohol and the other two are derived from a saturated alcohol containing a halogen atom and not more than two carbon atoms, the said esters containing (besides the phosphorus atom) carbon, hydrogen, oxygen and the halogen and no other elements and the only oxygen atoms present being those attached directly to phosphorus. The features of structure specified, including the relatively small proportion of carbon to phosphorus, contribute to the useful properties of the copolymers obtained. Unsaturated phosphorus-containing compounds of the kind specified are thought to be broadly novel and the invention includes these compounds, their preparation and copolymerisation and the copolymers so obtained.

The phosphorus esters of the present invention may be phosphoric acid esters of the formula:

$$P(O)(OR)_2(OR')$$

or allyl or methallyl phosphonates of the formula:—

$$R'P(O)(OR)_2$$

where (in both formulae) R=2-chlor- or 2-brom-ethylene and R'=allyl or methallyl.

A general formula for these esters is:

$$R'_{1-n}P(O)(OR)_2(OR')_n$$

where R and R' have the meanings ascribed above and $n=1$ or 0.

Of particular interest is bis(2-chlorethyl) allyl phosphonate:

$$CH_2=CH-CH_2P(O)(OCH_2CH_2Cl)_2$$

Mention may also be made of the corresponding methyallyl derivative:

$$CH_2=C(CH_3)-CH_2-P(O)(OCH_2CH_2Cl)_2$$

of corresponding allyl- and methallyl phosphonates in which the chlorine atoms have been replaced by bromine atoms, of allyl and methylallyl bis (2-chlorethyl)phosphates, $$P(O)(OCH_2CH=CH_2)(OCH_2CH_2Cl)_2$$

and $$P(O)(OCH_2C(CH_3)=CH_2)(OCH_2CH_2Cl)_2$$

and of corresponding phosphoric acid esters in which the chlorine has been replaced by bromine.

Of the aliphatic homopolymerisable mono-olefinic compounds of dipole moment greater than one to be copolymerised with the phosphorus containing esters, the most important are the nitriles of methacrylic and especially acrylic acids. Also important are vinyl esters of acetic and propionic acids and alkyl esters of acrylic or methacrylic acid in which the alkyl group contains 1 to 4 carbon atoms. The examples of comonomers other than acrylonitrile include: methacrylonitrile, acrylamide, methacrylamide, methylacrylate, methyl methacrylate, ethyl acrylate, ethyl methacrylate and vinyl acetate. Of special interest are copolymers of acrylonitrile with allyl bis(2-chlorethyl)phosphate or bis(2-chlorethyl)allyl phosphonate containing 2 to 10% and particularly 2 to 5% of combined phosphorus.

Example 1

In this example allyl bis(2-chlorethyl) phosphate, $CH_2=CH-CH_2OP(O)(OCH_2CH_2Cl)_2$ was prepared.

A solution of 68.8 parts of phosphorus trichloride in 40 parts of dry benzene was run gradually in the course of 30 minutes into a stirred solution of redistilled ethylene chlorhydrin (120.8 parts) in dry benzene (80 parts). Throughout the addition the temperature was kept at 7 to 9° C. and was then allowed to rise gradually in the course of an hour to 30° C. when 67.5 parts of sulphuryl chloride were added in the course of one hour. Dry air was then sucked through the reaction mixture for 90 minutes. Volatiles were reduced under 30 mm. pressure.

The reaction mixture, which contained a bis(2-chlorethyl)phosphorchloridate, ClP(O)(OCH_2CH_2Cl)_2 in amount substantially equivalent to the amount of phosphorus trichloride used, was diluted by the addition of 124 parts of dry benzene, allowed to stand over lead carbonate overnight, and filtered. To the filtrate 39.5 parts of pyridine was added and then, gradually, 29 parts of allyl alcohol dissolved in 24 parts of benzene, the temperature being kept at 11 to 12° C. during the addition. After allowing the mixture to stand until reaction was at an end the pyridine hydrochloride was filtered off and washed with benzene. The combined filtrate and washings were then washed with water, dried and distilled over hydroquinone under high vacuum. There was obtained in this way a 70% yield, based on the phosphorus trichloride, of allyl bis(2-chlorethyl) phosphate.

This preparation may be regarded as involving the following series of consecutive reactions:

(1) $PCl_3 + 3HOCH_2CH_2Cl \rightarrow P(OCH_2CH_2Cl)_3 + 3HCl$
(2) $P(OCH_2CH_2Cl)_3 + HCl \rightarrow$
$\qquad P(OH)(OCH_2CH_2Cl)_2 + ClCH_2CH_2Cl$
(3) $P(OH)(OCH_2CH_2Cl)_2 + Cl_2 \rightarrow$
$\qquad (ClCH_2CH_2O)_2P(O)Cl + HCl$
(4) $(ClCH_2CH_2O)_2P(O)Cl + HOCH_2CH=CH_2$
$\qquad + C_5H_5N \rightarrow (ClCH_2CH_2O)_2P(O)OCH_2CH$
$\qquad\qquad = CH_2 + C_5H_5N.HCl$ the chlorine in reaction (3) being supplied by the sulphuryl chloride.

In a similar way the methallyl ester can be made, using methallyl alcohol instead of allyl alcohol. Bis(2-bromethyl) allyl and methallyl phosphates can also be made by the same general method using ethylene bromhydrin instead of the chlorhydrin in reaction (1).

Example 2

In this example a copolymer of acrylonitrile and allyl bis(2-chlorethyl) phosphate was made.

In a closed stirred vessel flushed out with oxygen-free nitrogen an emulsion of the following composition was made at a temperature of 23° C.:

1600 parts of demineralised water
80 parts of acrylonitrile
56 parts of allyl bis(2-chlorethyl) phosphate
2.8 parts of potassium persulphate
0.6 part of ferrous sulphate
1.4 parts of sulphur dioxide
2.0 parts of sodium dioctyl sulphosuccinate.

During polymerisation the temperature rose to 27.5° C. and then fell to 24° C.

After 190 minutes the polymer was precipitated by running the reaction mixture into a saturated solution of sodium chloride. The polymer was filtered off, washed and dried. It was a pale yellow powder containing 5.34% of phosphorus, which dissolved in dimethyl formamide. From the solution a film was cast by the evaporative method. This was found to be substantially more resistant to burning than a similar film of polyacrylonitrile.

*Example 3*

The process was carried out as in Example 2 except for the following differences:
The emulsion had the following composition:

400 parts of demineralised water
16.2 parts of acrylonitrile
16 parts of allyl bis(2-chlorethyl) phosphate
0.8 part of potassium persulphate
0.2 part of ferrous sulphate
0.4 part of sulphur dioxide
0.5 part of sodium dioctyl sulphosuccinate.

The initial temperature was 19° C.; the rise in temperature was 8.5° C. and the polymerisation was continued for 120 minutes.

The polymer formed contained 3.54% of combined phosphorus. A 1% solution in dimethyl formamide had a viscosity of 2.78 centistokes. The resistance to burning of films cast from a solution of the polymer in dimethyl formamide was very slightly less than that of the films of Example 2.

*Example 4*

The process was carried out as in Example 2 except that the amount of acrylonitrile taken was 20 parts and the amount of allyl bis(2-chlorethyl) phosphate was 13.5 parts. The polymer obtained was similar to that of Example 3 except that it contained 3.28% of phosphorus and in 1% concentration in dimethyl formamide gave a solution of viscosity 3.01 centistokes.

*Example 5*

In this example bis(2-chlorethyl) allyl phosphonate $CH_2=CH-CH_2P(O)(OCH_2CH_2Cl)_2$ was prepared.

Ethylene oxide was passed into 275 parts of phosphorus trichloride at 15 to 20° C. until 290 parts of the ethylene oxide had been absorbed. When the reaction was complete the reaction mixture was transferred to a still and raised gradually to 98° C. at atmospheric pressure to remove excess of ethylene oxide. The pressure was then reduced to 0.2 mm. and the fraction boiling under this pressure at 98 to 101° C. was collected. This was composed substantially of tris(2-chlorethyl) phosphite $(ClCH_2CH_2O)_3P$.

In the next stage 135 parts of the tris(2-chlorethyl) phosphite was heated under oxygen-free nitrogen in a mild steel autoclave for 3½ hours at 140–150° C. with 40 parts of allyl chloride. The reaction mixture, a dark green oil, was washed out of the autoclave with benzene and after distilling off the benzene the residue was distilled under 0.2 mm. pressure and the fraction distilling at 118 to 120° C. was collected. This was composed substantially of bis(2-chlorethyl) allyl phosphonate.

This preparation may be regarded as involving the following series of consecutive reactions:

(1) 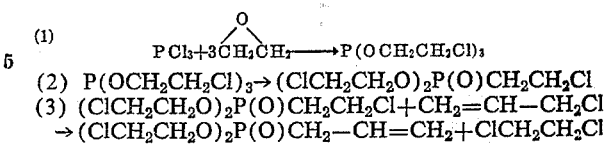

(2) $P(OCH_2CH_2Cl)_3 \rightarrow (ClCH_2CH_2O)_2P(O)CH_2CH_2Cl$
(3) $(ClCH_2CH_2O)_2P(O)CH_2CH_2Cl + CH_2=CH-CH_2Cl$
$\rightarrow (ClCH_2CH_2O)_2P(O)CH_2-CH=CH_2 + ClCH_2CH_2Cl$

*Example 6*

In the example a copolymer of acrylonitrile and bis(2-chlorethyl) allyl phosphonate was made by emulsion polymerisation.

The emulsion had the following composition:

400 parts of demineralised water
30 parts of acrylonitrile
8 parts of bis(2-chlorethyl) allyl phosphonate
0.8 part of potassium persulphate
0.2 part of ferrous sulphate
0.4 part of sulphur dioxide
2.0 parts of sodium dioctyl sulphosuccinate.

Polymerisation started at 21° C. The temperature rose slowly to 29° C. and then fell to 27.5 at 180 minutes after the start. The reaction mixture was then run into a saturated solution of sodium sulphate to precipitate the polymer, which was then filtered off, washed with water and dried.

The polymer was a cream coloured powder soluble in dimethyl formamide. A 1% solution therein had a viscosity 2.48 centistokes at 25° C. The polymer contained 3.46% of combined phosphorus. Films cast from a solution of the polymer in dimethyl formamide showed greater resistance to burning than films of acrylonitrile.

It will be understood that in place of the various chlorine-containing compounds specified corresponding bromine-containing compounds can be made and employed in copolymerisation.

The copolymers of the invention can be used in making filaments, films and moulded articles and in treating filaments and other fibrous materials, including battings and fabrics to improve their fire-resistance.

Having described our invention, what we desire to secure by Letters Patent is:

1. A copolymer of acrylonitrile and a monomer of the formula $R'_{1-n}P(O)(OR)_2(OR')_n$ where R is a member selected from the group consisting of 2-chlorethyl and 2-bromethyl, R' is selected from the group consisting of allyl and methallyl and n is selected from the group consisting of 1 and 0, the proportion of combined phosphorus in said copolymer ranging from about 2 to 10% by weight.

2. A copolymer according to claim 1 wherein the proportion of combined phosphorus in said copolymer ranges from about 2 to 5% by weight.

3. A copolymer of acrylonitrile and a monomer of the formula $CH_2=C(R)-CH_2-O-P(O)(O-CH_2-CH_2-X)_2$ where R is a member selected from the group consisting of hydrogen and methyl and X is selected from the group consisting of chlorine and bromine, the proportion of combined phosphorus in said copolymer ranging from about 2 to 5% by weight.

References Cited in the file of this patent

UNITED STATES PATENTS

| | | |
|---|---|---|
| 2,439,214 | Lindsey | Apr. 6, 1948 |
| 2,631,162 | Ladd et al. | Mar. 10, 1953 |
| 2,636,027 | Coover et al. | Apr. 21, 1953 |
| 2,714,100 | Toy et al. | July 26, 1955 |
| 2,743,261 | Coover et al. | Apr. 24, 1956 |
| 2,791,574 | Lanham | May 7, 1957 |
| 2,827,475 | Coover et al. | Mar. 18, 1958 |
| 2,854,434 | Beaman | Sept. 30, 1958 |